No. 686,285. Patented Nov. 12, 1901.
G. H. GRAY.
MACHINE FOR THE MANUFACTURE OF PRESSED GLASS ARTICLES.
(Application filed May 12, 1900.)
(No Model.) 5 Sheets—Sheet 4.
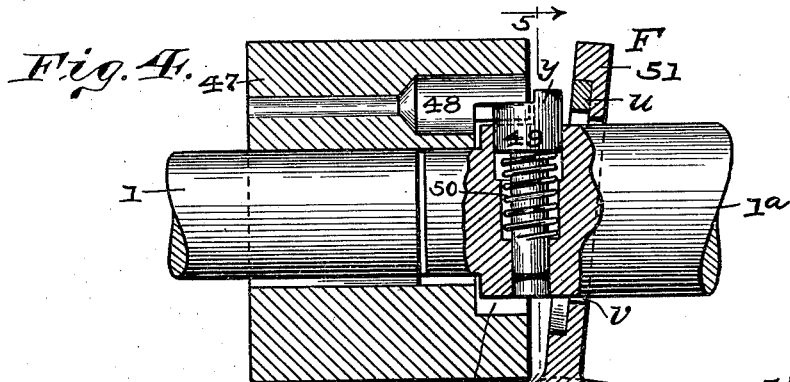
WITNESSES:
F. W. Woerner,
S. Mahlen Unger
INVENTOR.
Granville H. Gray,
BY Joseph H. Minturn
ATTORNEY.

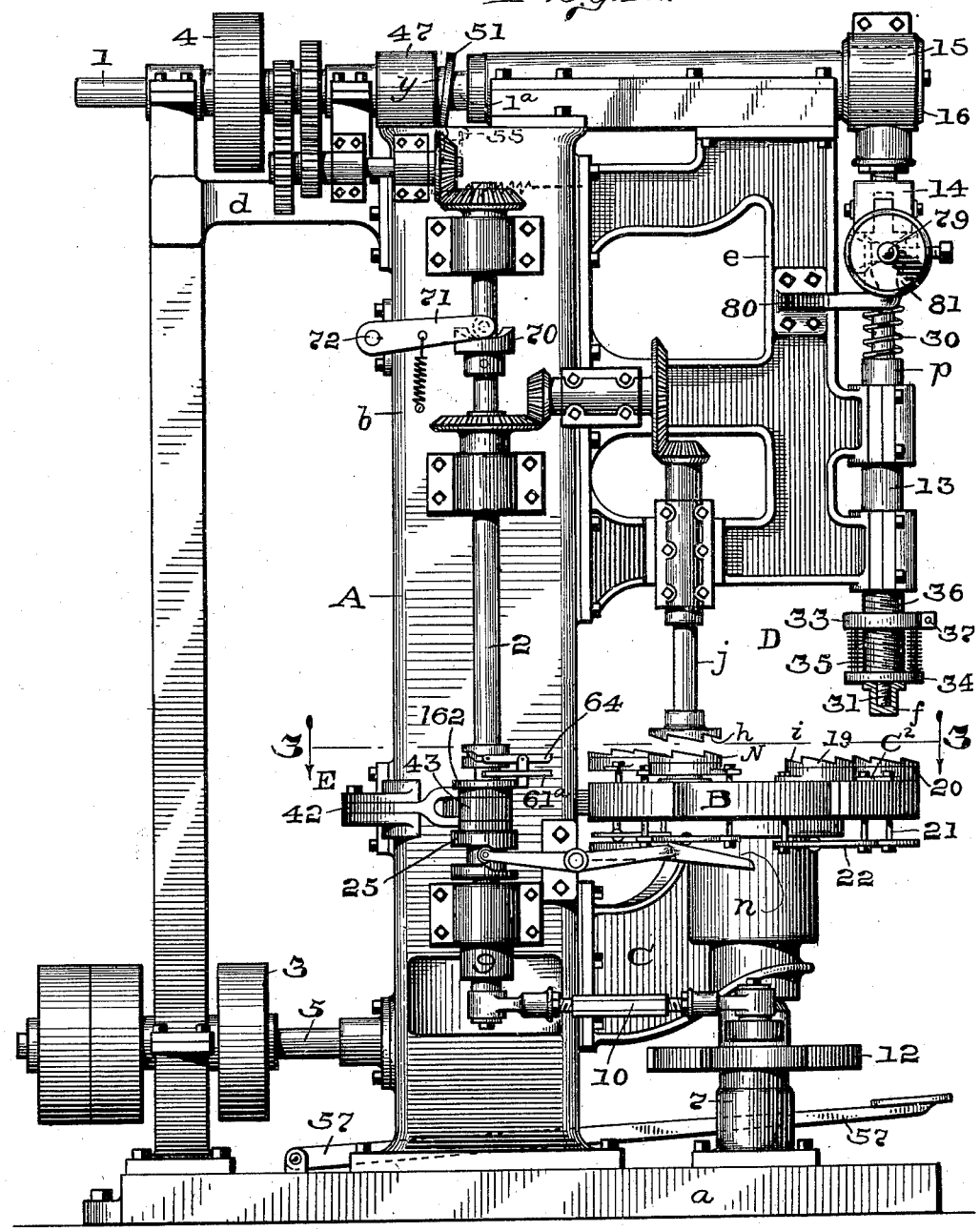
No. 686,285. Patented Nov. 12, 1901.
G. H. GRAY.
MACHINE FOR THE MANUFACTURE OF PRESSED GLASS ARTICLES.
(Application filed May 12, 1900.)
(No Model.) 5 Sheets—Sheet 1.
WITNESSES:
INVENTOR.
Granville H. Gray,
BY
ATTORNEY.

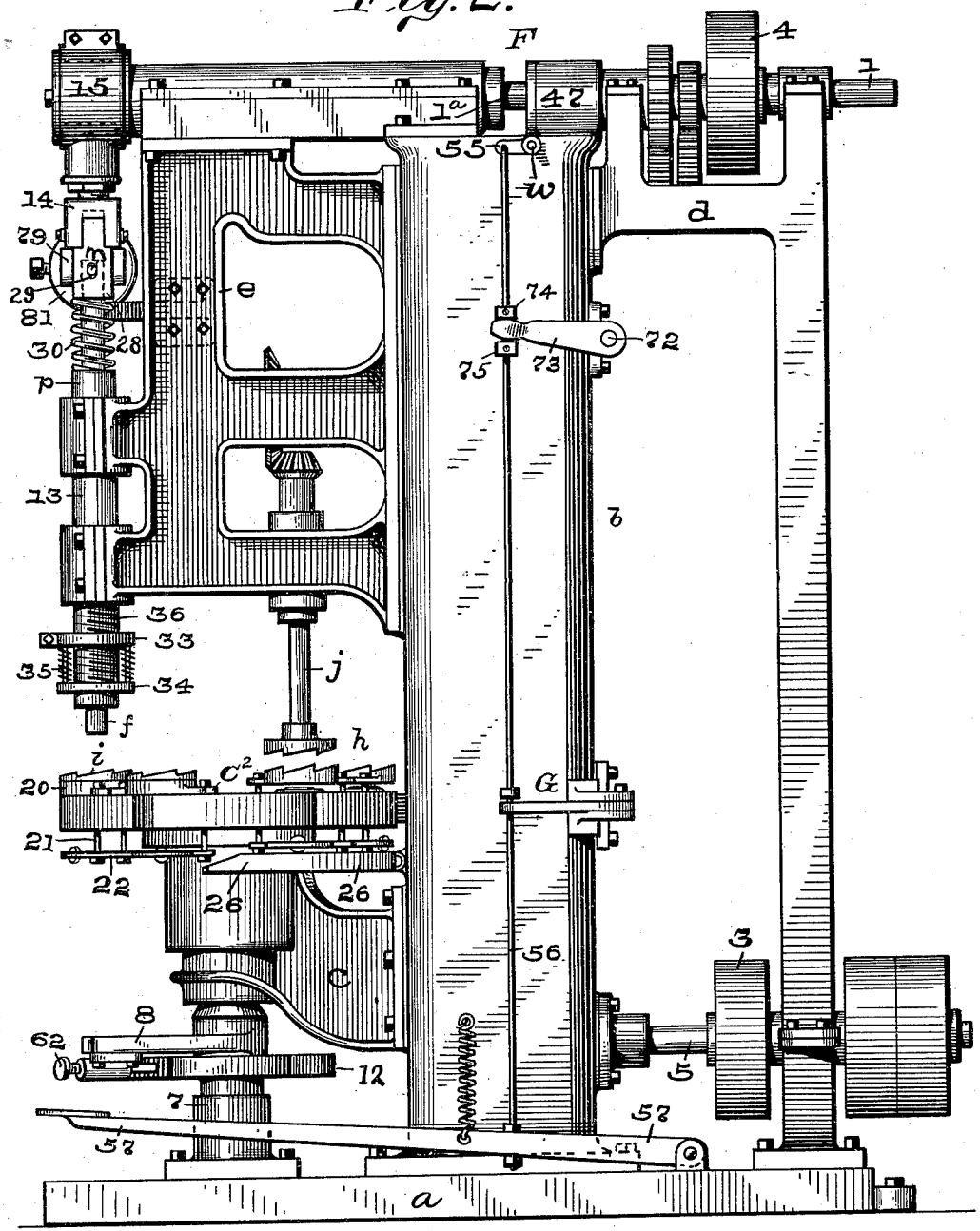

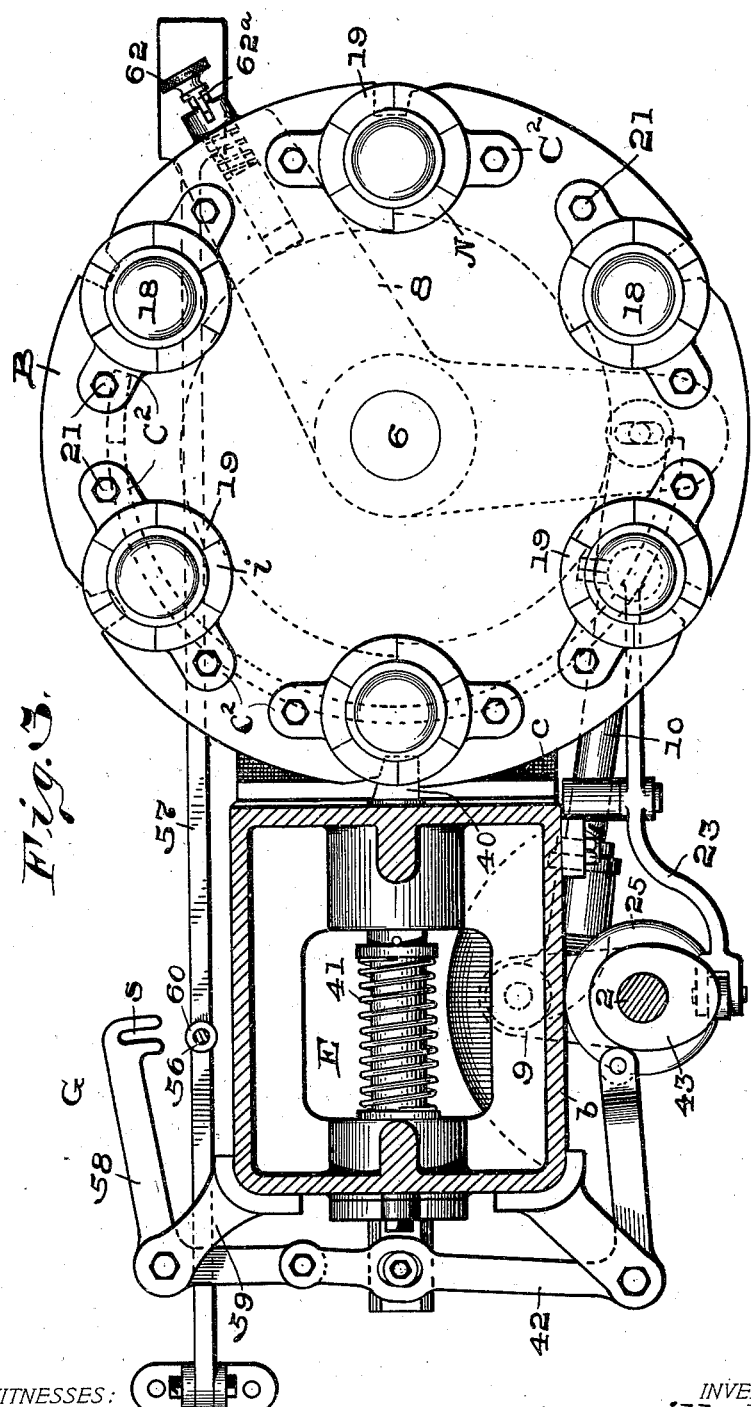

No. 686,285. Patented Nov. 12, 1901.
G. H. GRAY.
MACHINE FOR THE MANUFACTURE OF PRESSED GLASS ARTICLES.
(Application filed May 12, 1900.)

(No Model.) 5 Sheets—Sheet 5.

WITNESSES:
F. W. Woerner,
S. Mahlon Unger.

INVENTOR.
Granville H. Gray,
By Joseph A. Minturn
ATTORNEY.

UNITED STATES PATENT OFFICE.

GRANVILLE H. GRAY, OF MARION, INDIANA, ASSIGNOR TO GOLDEN GATE FRUIT JAR COMPANY, A CORPORATION OF CALIFORNIA.

MACHINE FOR THE MANUFACTURE OF PRESSED-GLASS ARTICLES.

SPECIFICATION forming part of Letters Patent No. 686,285, dated November 12, 1901.

Application filed May 12, 1900. Serial No. 16,495. (No model.)

*To all whom it may concern:*

Be it known that I, GRANVILLE H. GRAY, a citizen of the United States, residing at Marion, in the county of Grant and State of Indiana, have invented certain new and useful Improvements in Machines for the Manufacture of Pressed-Glass Articles, of which the following is a specification.

My invention relates to the manufacture of pressed-glass articles, and more especially to that class of pressed-glass articles in which there is a screw-thread upon a part of the article pressed; and to this end my invention consists of molds whereby the articles may be pressed and from which they can be automatically extracted, as fully set forth hereinafter and as illustrated in the accompanying drawings, in which—

Figure 7:
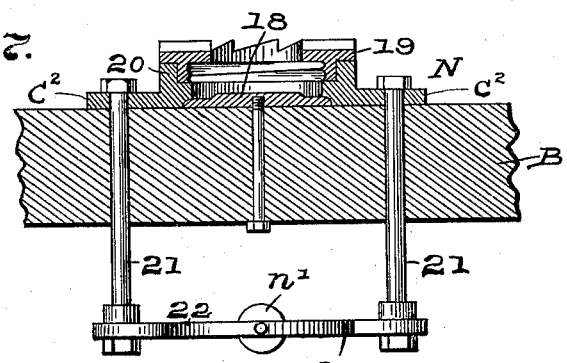
Figure 8:
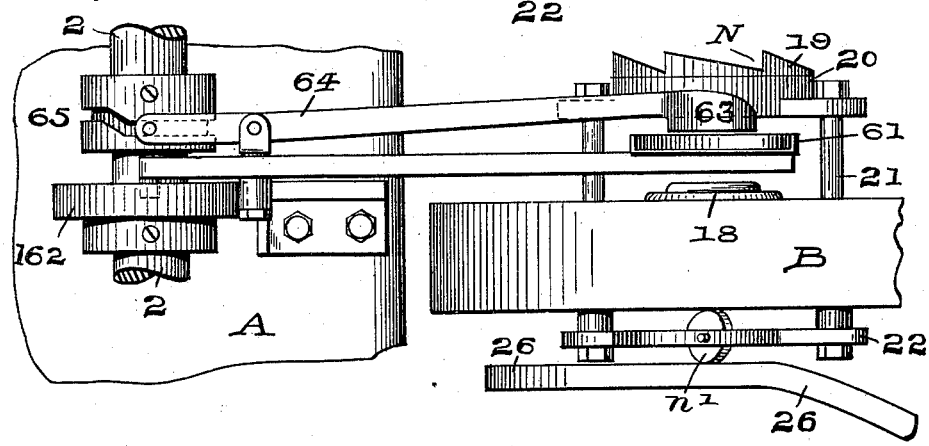
Figure 9:
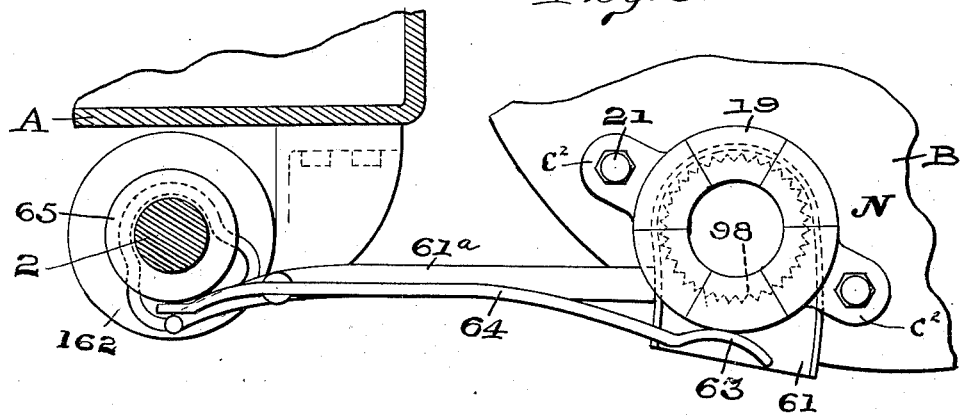

Figure 1 is an elevation of a machine for the manufacture of pressed-glass articles embodying my improvements. Fig. 2 is an elevation showing the opposite side of the machine. Fig. 3 is an enlarged sectional plan on the line 3 3 of Fig. 1. Fig. 4 is an enlarged section of the clutch device; Fig. 5, a section on the line 5 5, Fig. 4; Fig. 6, a detail in front elevation of the upper part of the machine, showing the equalizing-lever applied to the plunger; Fig. 7, a section through one of the molds and part of the table; Fig. 8, an elevation showing the means for discharging the articles after they have been molded, and Fig. 9 a plan of Fig. 8.

The frame A of the machine has, as shown, a standard *b* erected upon a base *a* and having at the top a head *d*, and from one side projects a bracket C, above which is another bracket *e*.

The driving-shaft I is horizontal, turning in bearings upon the head *d*, and through the medium of suitable gearing imparts motion to a vertical shaft 2, and a band-pulley 4 on the driving-shaft receives the driving-belt, passing from any suitable source—as, for instance, from a pulley 3 on a shaft 5, turning in bearings adjacent to the base of the machine.

Through the bracket C extends a vertical shaft 6, the lower end of which is stepped in a bearing 7, while the upper end carries a table B, to which an intermittent rotary motion is imparted by means of a sliding pawl 62, carried by an arm 8, swinging about the shaft and connected by a connecting-rod 10 with a crank 9 at the lower end of the shaft 2, the pawl engaging a ratchet 12 upon the shaft 6.

In the bracket *e* slides vertically a plunger-shaft 13, to the upper end of which is connected an arm 14, attached to a strap 15, which encircles an eccentric 16 upon the forward end of the shaft I, and at the lower end of the shaft 13 is a plunger *f* of any suitable shape.

Upon the table B are a series of molds N at uniform distance apart, which by the action of the pawl and ratchet aforesaid are successively brought beneath the plunger and arrested in this position, the plunger then descending into the mold beneath it and forcing the molten glass that has been deposited therein into the interstices of the mold, after which the plunger ascends and the table rotates to bring another mold beneath the plunger. Each mold N is intended to mold an article having an external screw-thread. As shown, it is intended for a preserve-jar cap having an external screw, substantially as in my Letters Patent No. 634,107, dated October 3, 1899, and after the molding of the same it becomes necessary to remove it from the mold by a rotary movement. To secure this result, I make use of a mold consisting of three parts—that is, a base 18, which forms the surface of the top of the cap and which is secured to the face of the table B, a ring 19, which forms the threaded exterior of the cap, and a ring 20, which forms the periphery of the cap, which portion is ribbed vertically or is polygonal. The ring 20 is connected with a yoke $C^2$, having two vertical rods 21 21, passing through the table, and a cross-piece 22, so that on lowering the yokes the rings 20 may be carried down onto the table, bringing the parts into coöperating position with the base 18, when the mold is to be filled with glass and the latter is to be pressed, while by raising the yokes the rings may be lifted away from the base 18 preliminary to rotating the ring 19. When the ring 19 is rotated, the molded article is prevented from rotating in consequence of the angular or ribbed periphery within the ring 20, as shown in dotted line 98 in Fig. 9, and as a result the article is forced downward out of the ring 20 and onto the table or to an automatic delivery device.

Any suitable means may be employed for rotating the threaded section of the mold. As shown, the section 19 has ratchet-teeth $i$ on its upper surface, forming a ratchet-ring adapted to engage with teeth of a ratchet $h$ on the end of a shaft $j$, driven by gears, as shown, or otherwise from the shaft 2, the shaft $j$ and its ratchet $h$ being so supported above the table B that when a yoke $C^2$ is elevated after the mold connected therewith has passed from the plunger the ring 19 is brought into engagement with the ratchet $h$, which is preferably maintained in continuous rotation, when the ring 19 will be rotated to discharge the molded cap, after which the yoke descends, bringing the parts into position after the rotation of the table to receive a new supply of molten glass prior to again being brought below the plunger.

Any suitable devices may be employed for lifting the movable sections of the molds successively after they have passed from beneath the plunger. As shown, there is a lever 23, arranged beneath the table B and having an end with an inclined face $n$, onto which a roller $n'$ on each cross-bar 22 rides as the table is rotated and whereby the mold-sections are lifted until the ratchet-teeth of the ring 19 are directly below and nearly in contact with those of the ratchet $h$. As the ring 19 is now concentric with the ratchet $h$, the mold-section is then positively further lifted by the rocking of the lever 23, the outer end of which is quickly depressed by the action of a grooved cam 25 on the lower end of the shaft 2. The lever 23 is brought by this rocking movement on a level with the stationary and curved track 26. As the table B is revolved, carrying the molds around with it, the roller $n'$ passes upon the curved track 26, whereby the elevated mold-section is kept in raised position until the roller reaches the end of the track. The track 26 will terminate on the opposite side of the the table, and its purpose is to hold the upper mold-sections out of contact with the base 18 and the table to prevent heating the latter parts as much as possible. The ring and ratchet remain in contact until the ring has turned a sufficient number of revolutions to discharge the molded cap, when the lever 23 will be vibrated to permit the descent of the mold-section upon the track 26. These operations take place while the plunger is descending and rising in molding the cap in one of the other molds.

It will of course be understood that if the thread is upon the interior of the article the molding parts will be properly changed to adapt them to the new conditions; but the other features may be retained.

In order to prevent the straining or breaking of the parts should too great a proportion of glass be deposited in a mold, I provide for a yielding connection between the plunger and the eccentric. This plunger-shaft may slide to a limited extent in a sleeve 28, pivoted to the rod 14 and with an elongated slot $m$ to receive a cross-pin 29, extending from the plunger-shaft, and a spring 30, coiled around the shaft, bears on the end of the sleeve 28 and on the shoulder $p$ of the shaft and tends to maintain the pin 29 at the bottom of the slot $m$; but if there is any obstruction to the downward movement of the plunger the shaft 13 can slide vertically in the sleeve 28 to a sufficient extent to prevent injury. The shaft 13 has a threaded projection 31 or is otherwise constructed for the attachment of plungers $f$ of any desired shape.

As the ring 19 lies loosely in the ring 20, it might be forced upward by the pressure of the molded material when the plunger descends. To prevent this, I provide means for maintaining pressure upon the ring 19 during the downward movement of the plunger. Different pressing devices and means for bringing them to bear upon the ring 19 at the proper time may be employed. Preferably such pressing device should be carried by the plunger, and I show a pressure device D, (see Fig. 1,) consisting of a yoke composed of a split ring 33, a disk 34 below the same, a series of rods 35, extending through both ring and disk and sliding in one or both of the same, and a spring upon each rod. The disk 34 has a sliding fit on the plunger-shaft, while the split ring 33 is stationary. The disk is forced down against the ring 19 by the springs 35, but allowing the plunger-shaft to descend through said ring. The ring 33 is internally threaded and adapted to a threaded portion 36 of the plunger-rod 13, so that by turning the ring it may be adjusted to any position on the plunger-rod, and it may then be clamped in position by means of a screw 37, passing through the split portions, so that by turning the screw the ring may be contracted and clamped in place upon the plunger-rod. With the pressure device thus arranged the descent of the plunger-rod brings the disk 34 into contact with the ring 19 and compresses the springs as the plunger descends into the mold, so that the ring 19 is held down with a spring-pressure. The weight of the plunger and all of the parts attached to and carried by it is considerable, and to relieve the machine of the unequal strain put upon it in lifting the plunger and the associated parts carried by it on the return or upward stroke I provide a lever 79, which is pivotally supported by the arm 80, attached to the body of the machine. The inner end of the lever 79 is bifurcated, and the arms of the fork take under the head or knuckle of the rod 14. The outer end of the lever 79 has a sliding weight 81, which can be secured at any desired adjustment on the lever 79 by the set-screw 82. This point of adjustment will be such as will cause the weight 81 to balance the weight of the plunger and its parts.

To prevent possible injury, the table should be positively locked when in a position for one of the molds to receive the plunger or for one of the screw-rings to engage its rotating ratchet. I therefore provide a locking device E, and this device may be of different forms. As shown, it is a locking-bar 40, sliding in the standard b and entering recesses symmetrically disposed in the periphery of the table B. This locking-bar is pressed forward by spring 41 and is operated from a bell-crank lever 42, one arm of which is connected with the outer end of the locking-bar, while the other arm is provided with a roller on a bearing on a cam 43 upon the shaft 2 above the cam 25.

It is desirable to maintain the driving devices I in constant operation, but to arrest the motion of the plunger as desired. For this purpose I provide a clutch mechanism or device F between two sections 1 1ª of the shaft I, so that the section 1, upon which is the pulley 4, may rotate constantly, but the movement of the other section 1ª, which is connected with the plunger, may be arrested. Upon the section 1 of the shaft is a sleeve 47, having in its outer face a recess $x$, into which extends the ends of one or more pins 48. The section 1ª carries a transverse bolt 49, fitting a transverse recess and pressed outward by a spring 50, a portion of this bolt extending into the recess $x$ of the sleeve 47, while another portion $y$ of the bolt is beyond the end of the sleeve. A wing 41 is pivoted at $w$ to the head $d$ and has a circular opening $v$ of a size to receive the shaft I and the projecting portion of the bolt 49 as the latter is carried around by the section 1ª of the shaft, but with a cam-face $u$, so arranged that when the wing is thrown in the direction of its arrow, Fig. 4, to the position shown in Fig. 2 and the bolt is carried within the recess $v$ the projecting portion $y$ of the bolt will by contact with the edge $u$ be carried inward, whereby the shoulder of the bolt cannot make contact with the pin 48. As a consequence of this, the portion 1ª of the shaft will not rotate with the driver portion of the shaft so long as the wing 51 occupies a position against or in proximity to the end of the sleeve 47. When, however, the wing 51 is carried to the position shown in Figs. 1 and 4, the bolt 49 remains outward and the pin 48 will be brought in contact with the side of the bolt and both sections of the shaft will turn together. Any suitable means may be employed for swinging the wing 51 into position. As shown, the wing is secured to a transverse shaft $w$, having an arm 53, to which is connected the spring 54, that tends to throw the wing inward, and thereby normally prevent the movement of the plunger. The shaft $w$ is provided with an arm 55, connected by a rod 56 with a treadle 57 near the bracket $c$, so that the operator by placing his foot upon the treadle may swing out the wing and cause the two parts of the shaft to turn together; but when his foot is removed from the treadle the operation of the plunger at once ceases. With the wing is also combined means for mechanically vibrating it, whereby while the section 1 of the shaft I rotates continuously the section 1ª may be automatically stopped and started, so as to arrest the movement of the plunger at the end of its downward stroke or at the termination of its stroke in either direction. These results may be effected by different devices. As shown, a cam 70 on a shaft 2 vibrates the arm 71 of a rock-shaft 72 and another arm 73 on which is connected to vibrate the wing-shaft, as by movable stops 74 75 on the rod 56, Fig. 2. By shifting the stops 74 75 the devices for operating the wing automatically may be thrown out of action.

It is very desirable that the plunger shall rest for a short time after having completed its downward movement in order that the glass may have time to harden in the mold. This is effected by the means described, as the contact of the pins 48 49 insures the rotation of the section 1ª with the section 1 until the wing is swung forward into place, when the pin 49 is carried back as the plunger reaches its lowest position, and it there remains until the wing swings out away from the sleeve 47, when the next pin 48 strikes the pin 49 and carries the shaft-section 1ª with the section 1. The wing 51 meanwhile has again swung in toward the sleeve 47, so that as the pin 49 reaches a vertical position it is depressed by the face $u$ and the motion of the plunger is again momentarily arrested. By placing a second segment in the wing, so as to afford a second bearing-face $u'$, Fig. 5, the plunger may be arrested momentarily at both the top and the bottom of its stroke.

It is of course necessary to prevent the plunger from being started in operation except when the table is in its proper position locked by the locking-bar 40. To insure this result, I combine with the means for starting the table in operation a detent device G of any suitable character that will prevent the operation of the starting devices except when the locking-bar 40 is in place locking the table. One form of detent is illustrated in Figs. 2 and 3, which show a detent in the form of a bell-crank lever 58, pivoted to a bracket 59, extending from the frame, one arm connected with one arm of the lever 42, while the other arm $r$ has a slot $s$, which when the lever is swung in the direction of its arrow, Fig. 3, receives the rod 56 below a collar 60. As a result of this arrangement when the locking-bar 40 is withdrawn from the table B the arm $r$ of the detent will be below the collar 60 and the rod 56 cannot be drawn down, and therefore the movement of the plunger cannot be started until the table has been turned to a position to permit the locking-bar 40 to enter one of the recesses, when the arm $r$ will swing outward and the clutch F may be engaged to operate the plunger.

As the shaft 2 operates continuously and as it is sometimes desirable to arrest the intermittent motion of the table, I provide means for throwing the pawl out of engagement with the ratchet 12—as, for instance, by providing the pawl with wings $62^a$, which may be turned to make contact with the end of the arm 8, and thus hold the pawl retracted.

While the molded articles may be drawn from the table by means of any suitable tool carried by the hand of the operator, I prefer to make use of a mechanically-operated discharger. Such device may be of different forms, and one which is effective is shown in Figs. 7 and 8. In these there is a blade 61, carried by an arm $61^a$, pivoted to the frame to swing horizontally and operated by a cam 62 on the shaft 2, so as to bring the blade 61 beneath the rings 19 and 20 when the latter are elevated and until the molded article is discharged and falls on the blade. The cam then swings the arm 61 to carry the blade outward as the rings 19 20 descend. As the blade again moves inward on another mold being brought opposite the blade, the article thereon is brought against a stop 63. As shown, this is a curved finger on the end of an arm 64, pivoted to swing vertically under the action of a grooved cam 65 on the shaft 2, so as to drop behind the article on the blade 61 after the latter has moved outward.

While I have shown certain devices for imparting movement to the main parts of the above-described apparatus, it will be evident that these may be altered and the gearing and adjustments may be varied without departing from the main features of my invention and that the character of the dies or molds may be varied according to the character of the articles to be formed, which may be caps or other articles of vitreous material.

Without limiting myself to the precise construction and arrangement of parts shown and described, I claim as my invention—

1. The combination in a machine for molding glass articles, of a reciprocating plunger, a table beneath the plunger, and means for moving the table with an intermittent motion, a sectional mold carried by the table, a shaft arranged above the table and adapted to engage one section of the mold, and means for elevating the mold to bring it into engagement with the said shaft, substantially as set forth.

2. The combination of a table, a means for rotating the same with intermittent motion, a series of molds carried by the table, each mold having a section adapted to be lifted from the table, a reciprocating plunger arranged above the table, and a rotating device also arranged above the table and adapted to engage one of the sections of the mold when the latter is lifted, substantially as set forth.

3. The combination of a movable table, its yokes sliding vertically therein and connected with sectional molds thereon, a rotating device above the table for engaging one section of each mold, a lever below the table having an inclined edge for engaging the yoke and partially lifting it, and means for vibrating the lever to bring the mold-sections into engagement with the rotating device, substantially as set forth.

4. The combination with the movable table, of a series of molds in sections, one section rotatable in respect to the other, a rotating shaft with an engaging device above the table, and means for lifting the sectional molds successively into engagement with said device, substantially as set forth.

5. The combination with the movable table, of a yoke carrying a mold in sections and movable vertically, ratchet-teeth upon one of the sections of the mold, a shaft above the table provided with a ratchet, and means for raising the mold-sections into engagement with the same, substantially as set forth.

6. The combination with a table provided with a series of molds each with a rotatable section, of a plunger, means for reciprocating the same, a rotating device for engaging the rotatable sections of the molds, means for lifting the mold-sections to bring the rotatable section into engagement with the rotating device, and a locking device for locking the table with the molds in position below the plunger and rotating device, substantially as set forth.

7. The combination of a circular table, means for rotating the same intermittently, series of molds, each having vertically movable and rotatable sections, a reciprocating plunger, and a rotating shaft arranged above the table, and a device upon the shaft for engaging the rotating sections of the molds, substantially as set forth.

8. The combination with the table of a glass-molding machine, of a yoke sliding in said table, a mold-section connected with the table, a second mold-section connected with the yoke, and a third mold-section carried by the second and rotatable upon the same, substantially as set forth.

9. The combination of the movable table, a series of sectional molds movable vertically and one section rotatable upon the other, a reciprocating plunger, and a spring-pressing device carried by the plunger and adapted to engage the upper sections of the molds and maintain a spring-pressure thereon during the descent of the plunger, substantially as set forth.

10. The combination with the movable table, reciprocating plunger and sectional molds movable vertically and provided with rotatable sections, of a presser device for holding the rotatable sections during the action of the plunger, substantially as described.

11. The combination with the movable table, reciprocating plunger and sectional molds movable vertically and provided with rotatable sections, of a presser device for holding the rotatable sections during the action of the plunger, and means for adjusting said presser device vertically upon the plunger-shaft, substantially as set forth.

12. The combination of the plunger and shaft I in two sections, one connected with the driving means and the other with the plunger, and a clutch device and means for intermittently operating the same to stop and start the shaft-section connected with the plunger to arrest the latter momentarily at both limits of its stroke, substantially as set forth.

13. The combination with the table, molds and plunger, of a shaft in two sections, means for driving one of the sections, a radially-movable pin upon one of the sections adapted to engage a projection upon the other, a movable wing with a face arranged to engage said pin to carry it out of engagement with such projection, and means for shifting the position of the said wing, substantially as set forth.

14. The combination of the movable table, its series of molds and plunger, a shaft in two sections, connected to operate the plunger, means for driving one of the sections, a clutch device between the sections, a locking-bar for locking the table in position prior to the operation of the plunger, and connections between the clutch device and said locking-bar whereby the plunger is prevented from being driven except when the locking-bar is in position to lock the table, substantially as set forth.

15. The combination with the table, its molds and means for lifting the latter, of a receiving-plate, means for carrying it beneath and from the elevated mold-sections, a stop-finger, and means for moving it vertically, substantially as described.

In witness whereof I have hereunto set my hand and seal, at Indianapolis, Indiana, this 17th day of April, A. D. 1900.

GRANVILLE H. GRAY. [L. S.]

Witnesses:
JOHN B. SHERWOOD,
S. MAHLON UNGER.